United States Patent [19]

Foster

[11] Patent Number: 4,588,053

[45] Date of Patent: May 13, 1986

[54] MULTIPLE RATE SHOCK ISOLATOR DAMPING VALVE

[75] Inventor: Robert M. Foster, Huntsville, Ala.

[73] Assignee: The United States of America as represented by the Secretary of the Air Force, Washington, D.C.

[21] Appl. No.: 651,961

[22] Filed: Sep. 19, 1984

[51] Int. Cl.[4] ............................................... F16F 9/34
[52] U.S. Cl. .................................. 188/275; 137/513.3; 188/280; 188/282; 188/317; 188/322.15
[58] Field of Search ............... 188/275, 280, 281, 282, 188/284, 316, 317, 318, 319, 320, 322.15; 137/513.3

[56] References Cited

U.S. PATENT DOCUMENTS

| 2,343,478 | 3/1944 | Rossman | 188/282 |
|---|---|---|---|
| 2,395,027 | 2/1946 | Whisler | 188/284 |
| 2,456,736 | 12/1948 | Rossman | 188/284 |
| 2,742,112 | 4/1956 | Wessel | 188/284 |
| 2,993,691 | 7/1961 | Parilla | 188/281 X |
| 3,057,441 | 10/1962 | Pribonic et al. | 188/284 |
| 3,461,991 | 8/1969 | Arendarski | 188/282 |
| 3,574,886 | 4/1971 | Solovieff | 188/284 X |
| 3,696,894 | 10/1972 | Brady et al. | 188/275 |
| 3,722,638 | 3/1973 | McClure | 188/280 |
| 3,888,436 | 6/1975 | Sealey | 188/282 X |
| 4,004,662 | 1/1977 | Sorgatz et al. | 188/284 |
| 4,284,177 | 8/1981 | Domek | 188/280 |

FOREIGN PATENT DOCUMENTS 294846 9/1966 Australia .............................. 188/275

*Primary Examiner*—Bruce H. Stoner, Jr.
*Assistant Examiner*—Richard R. Diefendorf
*Attorney, Agent, or Firm*—Donald J. Singer; Bobby D. Scearce

[57] ABSTRACT

A hydraulic shock isolator damping valve exhibiting variable damping depending on degree of valve extension is described which comprises a hydraulic cylinder defining closed fluid reservoirs at each end, a piston within the cylinder and interconnecting the structural members between which relative movement is damped, the piston having first and second axially spaced portions sized for slidably engaging the inner surface of the cylinder and including an intermediate third axial portion of reduced outer diametric size, the first and second portions each including a predetermined number of axial holes sized for displacement of fluid through the piston in response to movement of the piston through the fluid, and an annular member of outer diameter smaller than the first and second portions slidable on the third portion between confronting surfaces of the first and second portions, the annular member including a pair of confronting peripheral flanges, each including axial holes smaller in size and corresponding in number to and registering with the axial holes in the first and second portions. A spring loaded dashpot assembly may be included in the first or second portions for urging the annular member to a neutral position upon cessation of piston movement. A spring loaded radial pin may be slidably disposed in the wall of the third portion for engaging the annular member on its inner diameter, and an axial bore through the piston and closed at one end may receive a slidable shuttle valve for releasably engaging the radial pin and annular member.

4 Claims, 5 Drawing Figures

MULTIPLE RATE SHOCK ISOLATOR DAMPING VALVE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to improvements in hydraulic shock absorber systems, and more particularly to an improved mutli-directional, direct acting shock isolation system including a novel damper valve characterized by multiple damping rates dependent upon stroke direction, timing and extension.

Analysis of an existing liquid spring shock isolator system showed that an optimum spring size might be achieved if the damper valve could provide different damping rates depending on the direction and timing of strokes. It is desirable that such a damper exhibit low damping during the initial extension of the spring, then switch to a higher rate during all spring retractions, then to a still higher rate during subsequent extensions, and then reset to the intial condition upon cessation of motion.

The hydraulic shock isolation system of the present invention, including the novel three-way velocity-squared damper valve of which it is comprised, satisfies the aforementioned requirements in providing different damping rates dependent on the direction and timing of stroke.

It is, therefore, a principal object of the present invention to provide an improved hydraulically operated shock isolation system.

It is a further object of the invention to provide a damping valve to prevent excessive hydraulic cylinder pressures within a hydraulic system.

It is a further object of the present invention to provide a damper valve for a liquid shock isolator which exhibits various damping rates dependent on direction and timing of strokes.

It is yet another object of the invention to provide a vertical shock isolation system comprising a liquid spring damper valve that has low damping for the initial stroke, develops higher damping for subsequent strokes, then resets itself.

These and other objects of the present invention will become apparent as the detailed description of certain representative embodiments thereof proceeds.

SUMMARY OF THE INVENTION

In accordance with the foregoing principles and objects of the present invention, an improved direct acting, hydraulic shock isolator system including a novel damping valve exhibiting variable damping characteristics depending on degree of valve extension is described which comprises a hydraulic cylinder defining a closed reservoir at each end and containing a hydraulic fluid, a piston interconnecting the structural members between which relative movement is to be damped and disposed for slidable movement within the cylinder, the piston having first and second axially spaced portions sized for sealing engagement with the inner surface of the cylinder and connected by an intermediate third axial portion of reduced outer diametric size, the first and second portions each including a predetermined number of axial holes of predetermined size for displacement of fluid from one side of the piston to the other in response to movement of the piston through the fluid, and an annular member of outer diameter smaller than the first and second portions and slidably disposed on the third piston portion and restrained for axial movement between limits defined by the confronting surfaces of the first and second portions, the annular member including a pair of confronting peripheral flanges, each including axial holes smaller in size and corresponding in number to the axial holes in the first and second portions and disposed in substantially registering alignment therewith. A spring loaded dashpot assembly may be included in the first or second piston portions for urging the annular member to an intermediate neutral position upon cessation of movement of the piston. A spring loaded radial pin may be slidably disposed in the wall of the third piston portion for engaging the annular member on its inner diameter, and an axial bore may be provided through the piston and closed at one end for receiving a slidable shuttle valve for releasably engaging the radial pin and annular member, whereby different damping rates for the valve may be obtained depending on the position of the annular member on the third piston portion relative to the first and second piston portions.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
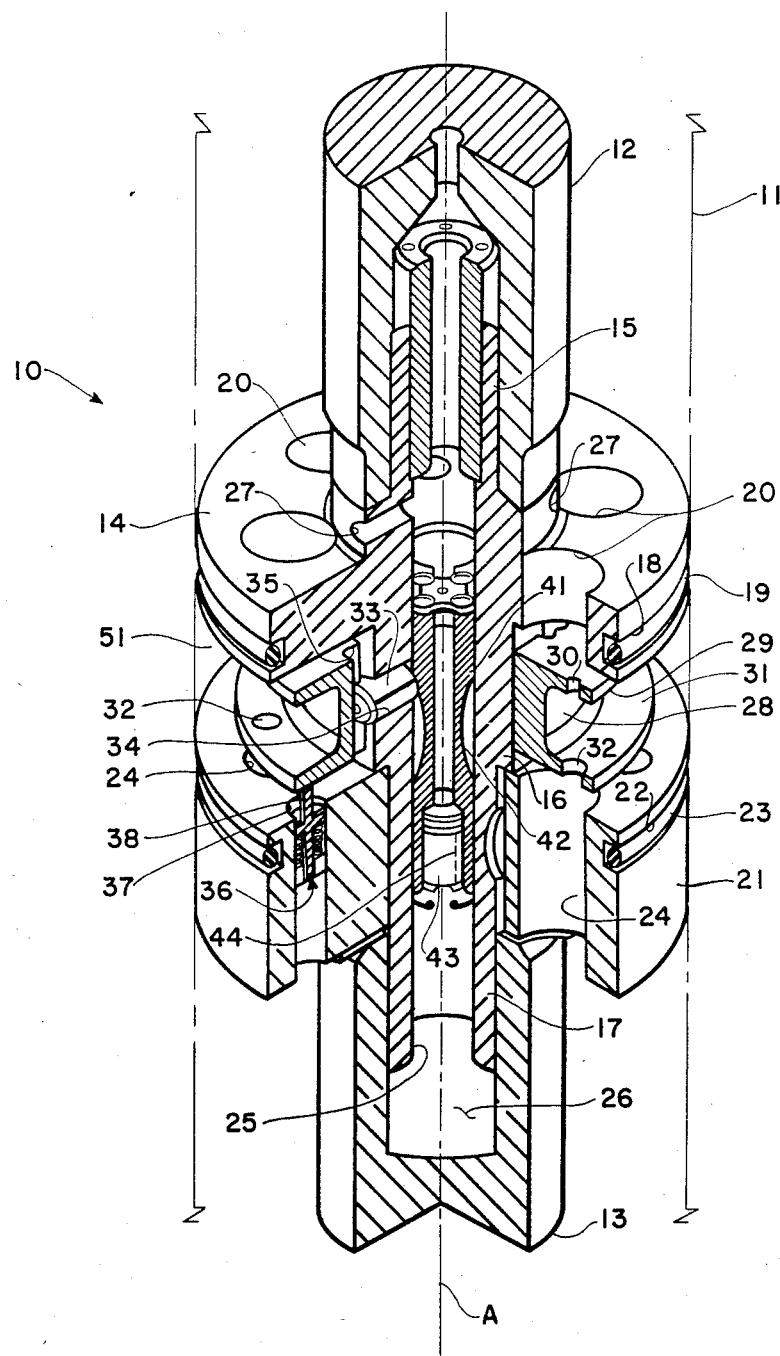
FIG. 1 is a perspective view in partial axial section of one representative embodiment of the novel damping valve of the present invention.

Referring now to the accompanying drawings, FIG. 1 presents a perspective view in partial axial section of a representative isolator damping valve 10 of the present invention. Valve 10 is enclosed within a hydraulic cylinder 11 (shown as a pair of broken peripheral lines), the ends of which define or are connected to closed reservoirs containing hydraulic fluid. Upper and lower connecting members 12,13 represent extensions of, and provide means to interconnect, the respective structural members, movable with respect to each other, and between which desirable variable shock damping may be provided utilizing valve 10. In a representative shock isolator unit built in demonstration of the invention, valve 10 was about eight inches in diameter, i.e. fit within an eight inch ID hydraulic cylinder 11, although valve 10 size is not considered limiting of the teachings herein.

Valve 10 assembly comprises a piston assembly including two axially spaced disk shaped portions connected by a third axial portion of reduced diameter, the piston configured for reciprocating movement within cylinder 11 in response to relative movement of structural connecting members 12,13. For example, as shown in FIG. 1, a first disk shaped upper piston or valve plate portion 14 may have a threaded axial extension 15 to provide means to attach the valve 10 assembly to upper connecting member 12, a first lower portion 16 of reduced diametric size for receiving a floating valve plate as hereinafter described, and a lower threaded extension 17 for receiving a second lower disk shaped piston or valve plate portion 21 and a lower connecting member 13, substantially as shown in FIG. 1. Both piston portions 14,21 are sized to provide a slidable hydraulic seal for valve 10 within cylinder 11. Accordingly, piston portion 14 may include a circumferential groove 18 for receiving an annular seal 19, and lower piston portion 21 may include circumferential groove 22 and an annular seal 23. Piston portions 14,21 each include one or more large axial bypass holes spaced around the surface of each portion, substantially as shown, respectively, as holes 20 (piston portion 14) and holes 24 (piston portion 21). Bypass holes 20,24 may preferably be substantially axially aligned and provide means for flow of hydraulic fluid through valve 10 for displacement thereby of the fluid from one side of the piston to the other, in the operation thereof as hereinafter described.

Piston portions 14 and 21 are axially spaced a predetermined distance, substantially as defined by the length of portion 16 for receiving an annularly shaped sliding damper valve plate 28 thereon between piston portions 14,21. Valve plate 28 has a maximum outer diameter smaller than that of piston portions 14,21, is sized on its inner diameter to slide on lower extension 16 between a first limit at which one side of valve plate 28 is in contact with piston portion 14 and a second limit at which the other side of valve plate 28 is in contact with piston portion 21, and is, in the inoperative or low damping modes, disposed in a neutral position substantially intermediate upper and lower piston portions 14,21, as suggested in FIG. 1. Valve plate 28 comprises upper and lower confronting flanges 29,31 as depicted most clearly in the sectional view portion of FIG. 1. Upper flange 29 includes flowthrough extension damping holes 30 of predetermined size and spaced around the surface of flange 29 in substantial axial registration with corresponding bypass holes 20 of piston portion 14. Similarly, lower flange 30 includes flowthrough extension damping holes 32 of predetermined size and spaced around the surface of flange 31, preferably in substantial axial registration with bypass holes 24 of piston portion 21. Holes 30 in upper flange 29 may be of diametric size smaller than holes 32 in lower flange 31 (or vice versa) in order to provide different, higher damping rates, depending on the position of valve plate 28 relative to piston portions 14,21, in the operation of valve 10 as hereinafter described.

Means may be included to releasably engage valve plate 28 on piston portion 16 whereby valve plate 28, in response to movement of valve 10 through the hydraulic fluid contained in cylinder 11, may be made to slide into contact with piston portion 14 or 21, whereby the flow of hydraulic fliud through holes 20 or 24, respectively, may be restricted by the smaller axially aligned holes 30 or 32, respectively, in the contacting surfaces of flanges 29 or 31, in order to provide a predetermined higher damping rate for valve 10 than when valve plate 28 is held in the neutral position intermediate piston portions 14,21. In the embodiment of FIG. 1, this may be accomplished by providing an axial bore 25 of predetermined size traversing the axial length of piston portion 14 and extensions 16,16,17 along axis A from a lower fluid chamber 26 defined near the juncture of threaded extension 17 and connecting member 13 to one or more radially disposed fluid inlet/outlet ports 27 in upper threaded extension 15 just above piston portion 14.

One or more (three in the demonstration device) spring loaded lock pins 33 ride in corresponding mating radial bores 34 and engage corresponding axial slots 35 on the inner diametric surface of plate 28 in order to maintain plate 28 at a predetermined median position between piston portions 14,21 except upon actuation of the valve as hereinafter described.

Lower piston portion 21 includes one or more (three in the embodiment illustrated) spring loaded dashpot assemblies 36 disposed in a like number of axial bores 37 spaced around the body of piston portion 21. Pins 38 on dashpots 36 are sized and disposed to just contact the lower surface of valve plate 28 at flange 31 in the neutral postion. The purpose of any included dashpot assemblies 36 is to assist in the centering of valve plate 28 in the neutral position intermediate piston portions 14,21 following the completion of a stroke, and the return of valve 10 to a neutral or rest position.

A shuttle valve 41 is slidably received within axial bore 25 of lower extension 16,17 for axial movement therein under the inertial effects of movement of valve 10 in the axial (along axis A) direction. Shuttle valve 41 is configured to contact the inner end of lock pin assemblies 33 to maintain valve plate 28 in the median position when shuttle valve 41 is in the neutral (inactive) position, as suggested in FIG. 1. A circumferential recess 42 of predetermined shape is included on the outer surface of shuttle valve 41 to cooperate with pin assemblies 33 to release valve plate 28 in response to upward axial movement of shuttle 41 within bore 25. Shuttle 41 includes a check valve 43 at its lower end, as illustrated. Check valve 43 may be in the form of a flapper valve located on the main body of shuttle valve 41, which configuration may be preferable in a valve 10 operable without regard to orientation or within an orientation insensitive environment.

In the operation of valve 10, the assembly may preferably be installed in the vertical orientation suggested in FIG. 1, with any initial liquid spring extension force imposed in a direction represented as downward in FIG. 1. It is instructive to note, however, that valve 10 may be adaptable for operation in any orientation, such as for lateral liquid spring applications, or in an orientation insensitive environment, by providing in upper piston portion 14 a set of centering dashpots similar in configuration and function to dashpots 36 in piston portion 21.

Figure 2:
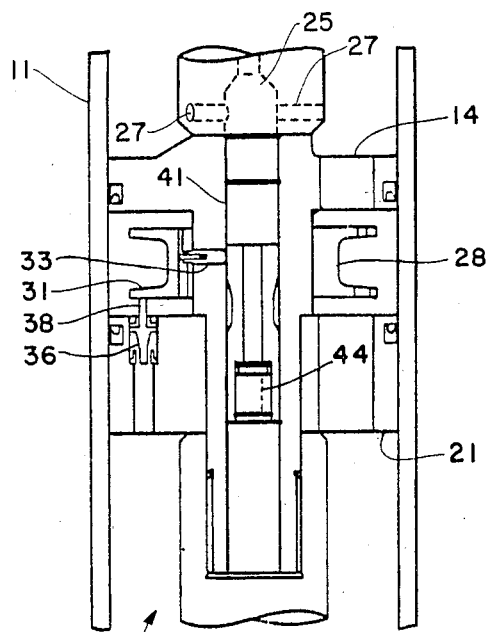
FIGS. 2–5 present schematic axial sectional views of the damping valve of the invention in various stages of operation.

The operation of isolator damping valve 10 may best be understood by reference to FIGS. 2-5, which show the positions of various movable elements of valve 10 during liquid spring extensions/retractions. Referring first to FIG. 2, shown therein is a valve 10 in a neutral position prior to the imposition of any force on the liquid spring. Note that in the position depicted in FIG. 2, valve plate 28 is substantially in an intermediate position between upper and lower piston portions 14,21 with lower flange 31 just in contact with pins 38 of dashpot assemblies 36; shuttle 41 is in its lowermost position at which position it urges lock pins 33 outwardly to maintain valve plate 28 in the intermediate position.

Figure 3:
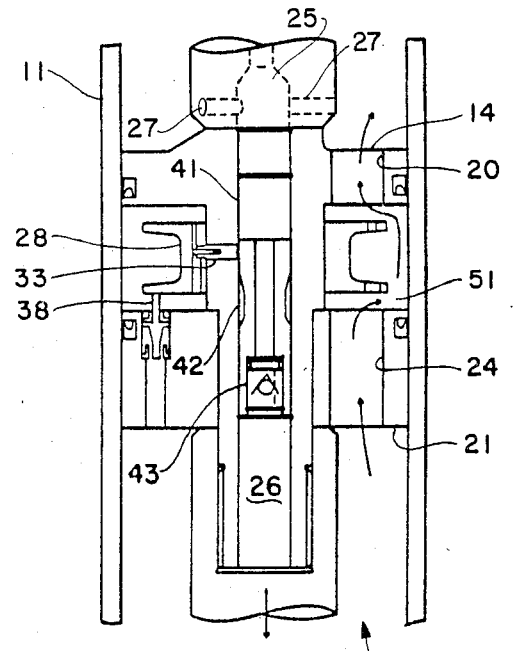

Reference is now made to FIG. 3 in conjunction with FIG. 1. Shown in FIG. 3 are the relative positions of the various elements of valve 10 during the initial, downward (as FIGS. 1-5 are viewed) stroke direction in which phase valve 10 is in the low damping mode.

During the initial (downward) liquid spring extension, fluid pressure and inertial effects hold valve plate 28 against lock pins 33. Fluid flow through valve 10 within hydraulic cylinder 11 may be as represented by the arrows, viz., through the large bypass holes 24 in lower piston portion 21, around sliding damper valve plate 28 through annular space 51 defined between valve plate 28 and the inner wall surface of cylinder 11, and through large bypass holes 20 in upper piston portion 14. The annular space 51 between the peripheral extremities of valve plate 28 and the inner surface of cylinder 11 provides a substantial bypass flow region for liquid between piston portions 14,21 around valve plate 28. During this phase of operation of valve 10, the inertial effects of the downward stroke causes shuttle valve 41 to move rapidly and upwardly within axial bore 25. Port(s) 27 may provide communication between axial bore 25 and the the interior of cylinder 11 for any required inflow/outflow of fluid relative to axial bore 25 to facilitate damped movement of shuttle 41. As shuttle 41 moves upwardly, the relative direction of fluid flow is downwardly through shuttle 41 and through check valve 43 which is open to down flow. The downwardly flowing fluid is trapped in lower chamber 26 by check valve 43, thereby preventing shuttle 41 from returning quickly to the neutral position (as shown in FIG. 2). When shuttle 41 reaches the top of its travel (i.e. where pins 33 retract into circumferential recess 42, approximately 0.94 inch of travel in the demonstration device), pins 33, which are spring loaded, are free to retract but are prevented from doing so by the force from valve plate 28 bearing against them.

Figure 4:
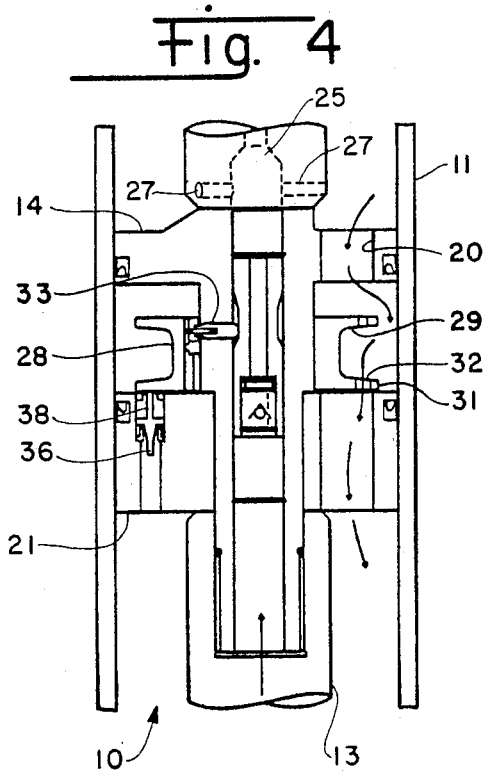

Referring now to FIG. 4, shown therein are the relative positions of the component parts of valve 10 during a medium damping mode, with an upward force direction on connecting member 13. For example, in a continuation of the stroke cycle begun as illustrated in FIG. 3, when the extension illustrated in FIG. 3 ceases and the liquid spring begins to retract (FIG. 4), valve plate 28 is forced by fluid pressure downwardly against lower piston portion 21 (valve 10 assembly is now moving upwardly through the fluid within cylinder 11). Lock pins 33 retract as soon as valve plate 28 is no longer pushing against them. Fluid flow is now downwardly through the large bypass holes 20 in upper piston portion 14, generally around upper flange 29 and through the retract damping flowthrough holes 32 in flange 31 of valve plate 28, providing a higher damping force than that characteristic of the condition of valve 10 illustrated in FIG. 3.

Figure 5:
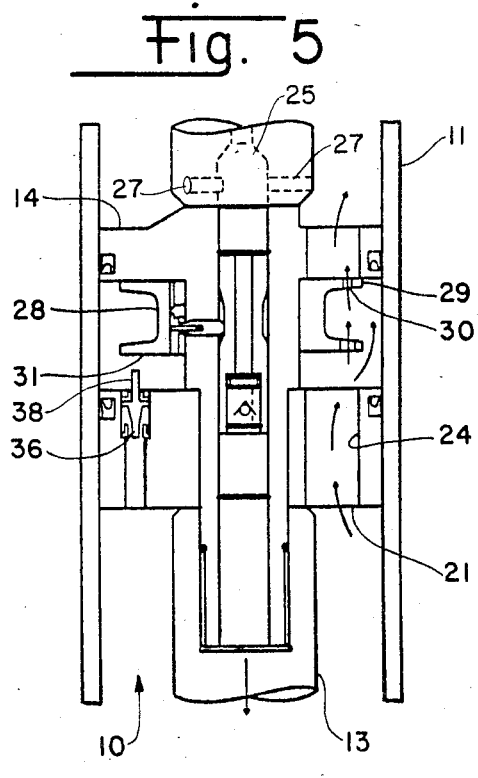

Subsequent extensions of the liquid spring in a downwardly direction may result in valve 10 entering the highest damping mode of operation, as illustrated in FIG. 5. The inertial effects of a large downward force on connecting member 13 (i.e. large liquid spring extension force) will force damper valve plate 28 upwardly against upper piston portion 14. This causes the fluid within cylinder 11 to flow upwardly through the large bypass holes 24 in lower piston portion 21, generally around flange 31, and through extension damping holes 30 in flange 29 of valve plate 28. The condition of the various elements of valve 10 as illustrated in FIG. 5 is characterized by a higher damping force than that characteristic of the condition illustrated in FIG. 4 by reason of the relatively smaller diametric size of holes 30 in flange 29 of the demonstration device as compared to holes 32 in flange 31. It will be apparent to one skilled in the art, however, that, within the scope of these teachings, the relative sizes of the respective flow-through holes 30,32 and bypass holes 20,24 may be alternatively selected to provide different damping rates in various stages of valve stroke than has herein been provided for the demonstration device.

When the extension forces on the liquid spring are removed, and valve motion ceases, the various elements of valve 10 revert to their neutral positions as illustrated in FIG. 2. In this condition, valve plate 28 again settles into the intermediate position between upper and lower piston portions 14,21 and and comes to rest upon the dashpot valve assemblies 36. Bypass hole 44 in check valve 43 allows fluid to be displaced from lower chamber 26 as shuttle 41 sinks under the force of gravity to its original position. Shuttle 41 forces lock pins 33 out and valve plate 28 is thus reset for the next forced extension.

Shuttle valve 41 is designed to move up very rapidly during the initial downstroke, and then slowly return to it original position after the high damping stroke. Check valve 43 allows shuttle 41 to move rapidly in the upward direction; bypass hole 44 through check valve 43 is sized to allow shuttle 41 to return slowly to its original position. The reset time of shuttle valve 41 can be adjusted by increasing or decreasing the weight of shuttle 41 and/or the size of bypass hole 44. In the demonstration device, shuttle valve 41 weighed about 2.61 pounds and reset in 12 seconds from the fully up position to the neutral position.

The purpose therefore of sliding damper valve plate 28 is to provide three different damping coefficients depending on stroke direction and degree of extension. During the initial downward movement of connecting member 13 (FIG. 3), valve plate 28 remains in the neutral or low damping position. When member 13 changes direction valve plate 28 may be forced to the medium damping mode by flow forces (FIG. 4). When member 13 changes direction again, valve plate 28 may be forced into the high damping mode by flow forces (FIG. 5).

The operation of the multiple rate shock isolator damping valve 10 of the present invention may be approximated by the following expression for the damping force $F_d$ which is generated during a stroke:

$$F_d = C_d V^2$$

where $C_d$ is the damping coefficient which characterizes the system and the hydraulic fluid, and $V$ is the velocity of the damping piston. For $F_d$ in pounds and $V$ in inches/second, $C_d$ is in $lb\text{-}sec^2/in^2$. Additional damping force may be generated by the frictional force between the damping piston seals (19,23) and the inner surface of cylinder 11, which may be minimized by suitable design of the seals, but which may cause the system to deviate somewhat from a pure velocity-squared damper.

Single stroke data were collected at several different velocities in both the low (FIG. 3) and medium (FIG. 4) damping modes in order to characterize the demonstration system with regard to its damping coefficient and mode of operation. A least squares fit of the data showed that the system may be configured to have a damping coefficient which is substantially independent of velocity over the normal operating range of the system in each phase (i.e., stroke) of operation. For the low damping mode of the demonstration system, the relationship between the damping force $F_d$ and velocity of the damping piston was shown to be:

$$F_d = 0.22V^{1.95}$$

and for the medium damping mode, $$F_d = 10.48V^{2.08}$$

Demonstration runs for a full three-way stroke indicated a very low damping coefficient for the initial stroke, about 0.2 lb-sec$^2$/in$^2$ (low damping), about 15 to 20 lb-sec$^2$/in$^2$ for the medium damping portion of the stroke, and about 30 to 45 lb-sec/in$^2$ for$^2$ the high damping portion of the stroke, all consistent with the above single stroke data.

Plots of damping force vs. displacement and connecting member velocity vs. displacement for a three-way stroke showed that there is little damping force produced in the demonstration device during the first 5 inches of motion in the high damping mode. This results because sliding damper valve plate 28 sticks to the top of lower piston portion 21 for approximately the first three inches of travel, until enough pressure is built up to break it away. When sliding valve plate 28 breaks free, it is slowly driven upwards until it seats on the bottom of piston portion 14, which takes about two inches of stroke. Connecting member 13 velocity at this point may be about 35 inches per second. When valve plate 28 seats against the bottom of upper piston portion 14, the damping force immediately rises. Approximately 9% of the total possible damping energy for the high damping stroke is lost due to this delay. After a three-way stroke, gravity resets sliding damper valve plate 28 from the high damping mode to the neutral position (see FIG. 2). During a 100% three-way test this took about 9.15 seconds. The test showed that valve plate 28 sticks to the bottom of piston portion 14 for about 8.75 seconds. After valve plate 28 loses contact with piston portion 14 it resets to the neutral positon in about 0.4 seconds. With sliding valve plate 28 stuck to the bottom of piston portion 14, shuttle valve 41 cannot reset because lock pins 33 cannot extend into their recessed holes unless valve plate 28 is in the neutral position. This added about 6 seconds to the shuttle valve 41 reset time, making a total reset time of about 18 seconds. The attractive force between sliding valve plate 28 and piston portion 14 which resists plate movement, known as "Jo-block" attraction, occurs between two flat, highly finished surfaces held together under a high load. To reduce this force, the amount of contact surface area may be made as small as possible, such as providing a rough finish on one or both of the contacting surfaces.

The present invention, as hereinabove described, therefore provides a novel shock isolation system comprising a liquid spring damper valve having damping rates dependent on the direction and timing of stroke. It is understood that certain modifications to the invention as described may be made, as might occur to one with skill in the field of this invention, within the scope of the appended claims. Therefore, all embodiments contemplated hereunder which achieve the objectives of the invention have not been shown in complete detail. Other embodiments may be developed without departing from the spirit of this invention or from the scope of the appended claims.

I claim:

1. A direct acting, hydraulic shock isolation system, comprising:

(a) a hydraulic cylinder including means defining a closed reservoir at each end thereof, said cylinder containing a hydraulic fluid;
 (b) a piston disposed for slidable movement within said cylinder, said piston comprising first and second axially spaced portions sized for sealing engagement with the inner surface of said cylinder, said first and second portions connected by an intermediate third axial portion of said piston of reduced outer diametric size relative to said first and second portions;
 (c) each said first and second portions including means defining a predetermined number of axial holes therethrough of predetermined size for displacement of said fluid from one side of said piston to the other in response to said movement of said piston through said fluid within said cylinder;
 (d) an annular member of outer diameter smaller than said first and second portions slidably disposed on said third portion and restrained for axial movement between limits defined by the confronting surfaces of said first and second portions, said annular member including a pair of confronting peripheral flanges, each of said flanges including means defining axial holes therethrough, smaller in size and corresponding in number to said predetermined number of axial holes in said first and second portions and disposed in substantially registering alignment therewith; and
 (e) means for releasably engaging said annular member on said third portion in response to movement of said piston through said fluid, said means for releasably engaging said annular member including a spring loaded radial pin slidably disposed in the wall of said third portion and engaging said annular member in the inner diameter thereof, and a shuttle valve slidably disposed on said third portion for releaseably engaging said spring loaded radial pin in response to movement thereof on said third portion.

2. A direct acting, hydraulic shock isolation system comprising:

(a) a hydraulic cylinder including means defining a closed reservoir at each end thereof, said cylinder containing a hydraulic fluid;
 (b) a piston disposed for slidable movement within said cylinder, said piston comprising first and second axially spaced portions sized for sealing engagement with the inner surface of said cylinder, said first and second portions connected by an intermediate third axial portion of said piston of reduced outer diametric size relative to said first and second portions;
 (c) each said first and second portions including means defining a predetermined number of axial holes therethrough of predetermined size for displacement of said fluid from one side of said piston to the other in response to said movement of said piston through said fluid within said cylinder;
 (d) an annular member of outer diameter smaller than said first and second portions slidably disposed on said third portion and restrained for axial movement between limits defined by the confronting surfaces of said first and second portions, said annular member including a pair of confronting peripheral flanges, each of said flanges including means defining axial holes therethrough, smaller in size and corresponding in number to said predetermined number of axial holes in said first and second portions and disposed in substantially registering alignment therewith; and (e) a spring loaded dashpot assembly disposed in one of said first and second portions for urging said annular member to a predetermined neutral position intermediate said first and second piston portions in response to the cessation of said movement of said piston.

3. A direct acting, hydraulic shock isolation system comprising:

(a) a hydraulic cylinder including means defining a closed reservoir at each end thereof, said cylinder containing a hydraulic fluid;

(b) a piston disposed for slidable movement within said cylinder, said piston comprising first and second axially spaced portions sized for sealing engagement with the inner surface of said cylinder, said first and second portions connected by an intermediate third axial portion of said piston of reduced outer diametric size relative to said first and second portions;

(c) each said first and second portions including means defining a predetermined number of axial holes therethrough of predetermined size for displacement of said fluid from one side of said piston to the other in response to said movement of said piston through said fluid within said cylinder;

(d) an annular member of outer diameter smaller than said first and second portions slidably disposed on said third portion and restrained for axial movement between limits defined by the confronting surfaces of said first and second portions, said annular member including a pair of confronting peripheral flanges, each of said flanges including means defining axial holes therethrough, smaller in size and corresponding in number to said predetermined number of axial holes in said first and second portions and disposed in substantially registering alignment therewith;

(e) means defining an axial bore through said piston, closed at one end near said first portion and extending through said third and second portions; and (f) means for releasably engaging said annular member on said third portion in response to movement of said piston through said fluid, said releasable engaging means including a spring loaded radial pin slidably disposed in the wall of said third portion and engaging said annular member on the inner diameter thereof, and a shuttle valve slidably disposed within said axial bore for engaging said pin in response to movement thereof within said axial bore.

4. The shock isolation system as recited in claim 3 further comprising means defining an inlet port for said axial bore through said second portion, through which said axial bore may communicate with said hydraulic cylinder to provide flow of said hydraulic fluid into and out of said axial bore.

* * * * *